United States Patent [19]

Craig

[11] 3,721,755

[45] March 20, 1973

[54] COLOR TELEVISION ENCODER MODULATOR

[75] Inventor: Philip V. C. Craig, Salt Lake City, Utah

[73] Assignee: Telemation, Inc., Salt Lake City, Utah

[22] Filed: March 29, 1971

[21] Appl. No.: 129,079

[52] U.S. Cl.................178/5.4 R, 307/240, 307/251, 330/9, 332/31 T, 332/43 B, 332/45 R

[51] Int. Cl.............................H04n 5/40, H03c 1/52

[58] Field of Search.........332/43 B, 43, 31, 31 T, 44, 332/45 R; 330/9, 10; 307/215, 240; 325/152, 137, 138; 178/5.4 R, 5.45 D

[56] References Cited

UNITED STATES PATENTS

| | | | |
|---|---|---|---|
| 3,317,661 | 5/1967 | Dischert et al. | 325/137 UX |
| 3,339,087 | 8/1967 | Forbes | 307/240 |
| 3,541,320 | 11/1970 | Beall | 330/9 X |
| 3,621,473 | 11/1971 | Stoffer | 332/44 X |

*Primary Examiner*—Alfred L. Brody
*Attorney*—Lynn G. Foster

[57] ABSTRACT

A balanced modulator circuit for use in television cameras to impress color information on the chrominance subcarrier wherein the video input is phase-split and the resulting signals are fed through respective bootstrap emitter-followers, the outputs of these emitter-followers are chopped by respective field effect transistors gated by respective 3.58MHz clock signals which are 180° out of phase and a third field effect transistor, operated in a saturation mode wherein 10 ma. forward current is drawn, is connected across the outputs of the emitter-followers and gated by clamp source pulses to clamp the emitter-follower outputs at zero reference.

5 Claims, 2 Drawing Figures

INVENTOR.
PHILIP V. C. CRAIG
BY Lynn G. Foster
ATTORNEY

INVENTOR.
PHILIP V. C. CRAIG
BY
ATTORNEY

COLOR TELEVISION ENCODER MODULATOR

BACKGROUND

1. Field of Invention

This invention relates to modulator circuits and is particularly directed to balanced modulator circuits used in color television cameras to impress color information on the chrominance subcarrier signal for transmission.

2. Prior Art

In a color television color encoder one of the design objectives is to produce a 3.58mhz sine wave called chrominance to carry the color information. This 3.58mhz sine wave should have an amplitude equal to $\sqrt{I^2+Q^2}$ and a phase equal to $$\tan^{-1}\frac{I}{Q}+33^\circ$$

with respect to the reference phase. I and Q are video voltages which are functions of the red, green and blue components that represent the color to be transmitted.

In conventional circuits to make chrominance each of the two videos, I and Q, is applied to a linear doubly-balanced modulator to modulate a 3.58mhz "carrier" signal. The "carrier" phases to the two modulators are in quadrature so that when the two outputs are mixed, the result satisfies the amplitude requirement of $\sqrt{I^2+Q^2}$ (amplitude of the vector sum of two sine waves in quadrature) and the phase requirement $\tan^{-1}$ (I/Q) (phase of the vector sum of two sine waves in quadrature). A more detailed description of this process may be found in the copending application of Joseph H. Labrum entitled "Color Television Camera Optics" Ser. No. 129,025, filed Mar. 29, 1971 and assigned to TeleMation, Inc.

Balanced modulators of the prior art have used conducting semiconductor junctions in the actual modulation device, such as a diode bridge with two transformers or an integrated circuit like Motorola MC1956. All such junction modulators have thermal drift, aging drift, initial differences, transformer symmetry errors, input clamp semiconductor drift, gain drift, sensitivity to power supply variations, etc. causing the need for balance and gain adjustment. In practice these adjustments need to be adjusted typically several times per week to maintain the customarily specified 40db minimum ratio between chrominance amplitude at zero I and Q video (no color) and full signal chrominance amplitude, and to maintain proper amplitude and phase in the chrominance output.

In the invention described herein all such adjustments and selected components are eliminated, and a "subcarrier rejection" ratio of 50db is automatically maintained using a novel, seldom understood mode of operation of junction field effect transistors, such as 2n555. In this mode of operation, using the 2N555, for example, 10 ma of forward gate current is drawn reducing the "on" source to drain resistance, $R_{ds}$, of the 2n5555 form the manufacture-specified value of 150 ohm maximum (120 ohm typical) to 3 ohm. This 3 ohm mode is actually not a "field effect" enhancement mode, but a saturation mode, storing about 1,000 picocoulombs of charge in the channel.

BRIEF SUMMARY AND OBJECTS OF THE INVENTION

In summary, the present invention comprises balanced modulator circuits used in color television to impress color information on the chrominance subcarrier signal for transmission.

Accordingly, it is a primary object of the present invention to provide an improved balanced modulator circuit.

Another object of the present invention is to provide a balanced modulator circuit which is free of errors due to drift, sensitivity to power supply variations, transformer asymmetry, and the like.

A further object of the present invention is to provide a balanced modulator circuit which has virtually no adjustment requirements.

An additional object of the present invention is to provide a balanced modulator circuit which is simple, reliable, economical, and maintenance-free.

Another object of the present invention is to provide a balanced modulator circuit using a junction field effect transistor in a saturation mode wherein 10ma of forward gate current is drawn.

These and other objects and features of the present invention will be apparent from the following detailed description taken with reference to the accompanying drawing.

DETAILED DESCRIPTION OF THE ILLUSTRATED EMBODIMENT

Figure 1:
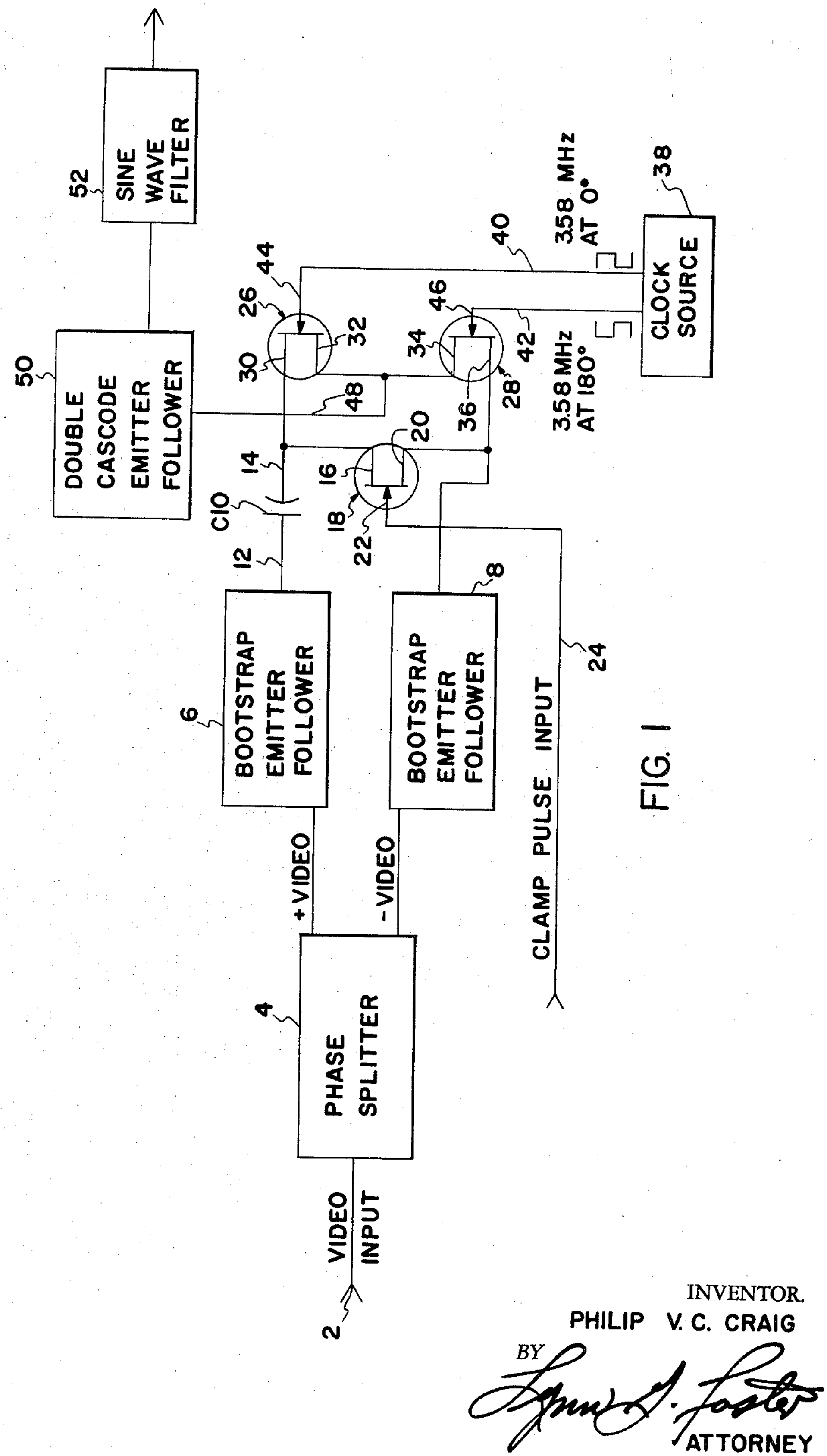
FIG. 1 is a diagrammatic representation showing a balanced modulator circuit embodying the present invention.

In that form of the present invention chosen for purposes of illustration, FIG. 1 shows a balanced modulator having a video input 2 which is supplied to a precision, low-distortion, phase splitter 4 comprising two transistors 57 and 58. The positive output of phase splitter 4 is applied to a first bootstrap emitter-follower 6, comprising transistors 61 and 62 and their associated resistors and capacitor, while the negative output from phase splitter 4 is applied to a second bootstrap emitter-follower 8 comprising transistors 59 and 60 and their associated resistors and capacitor. The low impedance output of emitter-follower 8 is connected directly to a source 36 to a chopper field effect transistor 28. A clamp capacitor C10 has one side 12 thereof connected to the output of emitter-follower 6.

The desired signals to be derived from the video input are generated at the collector load resistors 102 and 103 of transistors 57 and 58 but because direct utilization would cause impedance mismatching, the signals are used to drive the bootstrap emitter-followers 6 and 8 comprised of transistors 61 and 62, and 59 and 60. The clamp capacitor C10 (and its associated radio frequency bypass capacitor C11) are used to couple the output of bootstrap emitter-follower 6 to the other field effect transistor chopper source 26 for purpose of establishing the input video zero reference. Transistor 63 serves to divide gate current of clamping transistor 18 equally between source and drain to avoid 15 mv of clamp offset that would otherwise result.

Specifically, the other side 14 of capacitor C10 is connected to the drain electrode 16 of a field effect transistor 18, such as a 2N5555, although other depletion mode junction field effect transistor choppers could be used, while the source electrode 20 of transistor 18 is connected to the output of emitter-follower 8 and the gate 22 of transistor 18 is supplied by the clamp pulse input 24.

A pair of field effect transistors 26 and 28, of similar type as transistor 18, are connected in opposing relation with each other in shunt with transistor 18 to form a "chopper." Thus, the source electrode 30 of transistor 26 is connected to side 14 of capacitor C10, while the drain electrode 32 of transistor 26 is connected to the drain electrode 34 of transistor 28. As mentioned, the source electrode 36 of transistor 28 is connected to the output of emitter-follower 8. A suitable clock source 38, such as a crystal clock and a flip-flop circuit, generates a 3.58MHz square-wave signal on two outputs 40 and 42 which are 180° apart in phase. Some sources 38 require amplification to yield sufficient voltage swing to drive the field effect transistors 26 and 28 as desired. The transistors 51 and 52 are connected as a balanced pair of non-saturating amplifier.

It is also desirable to rigidly control the potential difference between the sources 30 and 36 of the field effect transistors 26 and 28 and their respective gates 44 and 46 to insure that the gate-to-source potential difference changes only with the changes that comprise the 3.58MHz signal and does not vary with changes in the I (or Q) signals. This objective is met by varying the voltage source ends of the load resistors of transistors 51 and 52 in accordance with the I (or Q) signals so that when the sources of the field effect transistor rise or fall with the variations of the I (or Q) signals, the gates also rise or fall to maintain exactly a constant fixed and exact potential difference.

Thus the desired amplification of the 3.58MHz signal and the isolation of the field effect transistor gates from I (or Q) signal variations are both achieved by using complementary PNP-NPN direct coupled emitter-followers to supply collector potentials to the amplifiers 51 and 52. The collector voltage source is thus rigidly held to the exact voltage of the respective +I or −I (+Q or −Q) signals. The complementary PNP-NPN emitter-follower arrangement has an added advantage of providing excellent temperature compensation characteristics.

Thus, the signal from output 40, at 0° phase, is applied to the gate electrode 44 of transistor 26 at 180° phase, while the signal from output 42, at 180° phase, is applied to the gate electrode 46 of transistor 28 at 0° phase. The output of the modulator is taken at the connection between transistors 26 and 28, as seen at 48, and is passed to a double cascode emitter-follower 50 and sine wave filter 52 (FIG. 1) to provide the desired output signal.

In operation, as described above, the modulator of the present invention employs a field effect transistor, such as a 2n5555, in a mode of operation wherein 10ma of forward gate current is drawn. This reduces the "on" source to drain resistance $R_{ds}$ of the 2n5555 from the manufacturer-specified value of 150 ohms maximum (120 ohms typical) to 3 ohms. This 3 ohm mode is actually not a "field effect" enhancement mode, but a saturation mode, storing about 1,000 picocoulombs of charge in the channel.

Now this mode has no inherent offset voltage when the gate current is divided equally between source and drain, just as the 150 ohm mode has none. Thus there is no thermal offset drift. Also, by using 2N5555's as switches there is no thermal gain drift, no matching of parts, no adjustments—in short, none of the adjustment problems inherent in conventinnal I and Q modulators. These features are used in the modulator of the present invention.

During television horizontal retrace, when the value of the input video is zero reference, the clamp transistor 18 is turned on in the 3 ohm gate conduction mode causing the clamp capacitor C10 to discharge to where the positive video and inverted video to the chopper 2N5555's are at equal DC levels. Thus the chopper, formed by transistors 26 and 28, which is driven at a 3.58MHz rate, chops between equal levels. Since there are no junction drops to vary between the choppers' sources and drains, there is no subcarrier output. Consequently the 50db subcarrier rejection ratio is absent of thermal and aging variances, adjustments and other symmetry problems.

When input video goes to a value other than zero reference, the chopper transistors 26 and 28 produce a square wave whose peak to peak amplitude is exactly twice the input video amplitude and whose phase is 0° or 180°, according to the polarity of the input video relative to zero reference. This provides, at the output of emitter-follower 50, the desired output of conventional I and Q modulators except that the square wave should be a sine wave. To accomplish this, the I and Q modulator outputs are mixed as square waves, then filtered by sine wave filter 52, to remove harmonics, putting out a sine wave whose amplitude is $\sqrt{I^2 + Q^2}$ and whose phase is $\tan^{-1}$ (I/Q).

The use of square waves, of amplitude limited to exactly twice the input eliminates much of the amplitude and phase drift errors involved in conventional modulators which either use sine waves or non-limited square waves. This also improves the quadrature accuracy and linear amplitude fidelity of the chrominance output.

Figure 2:
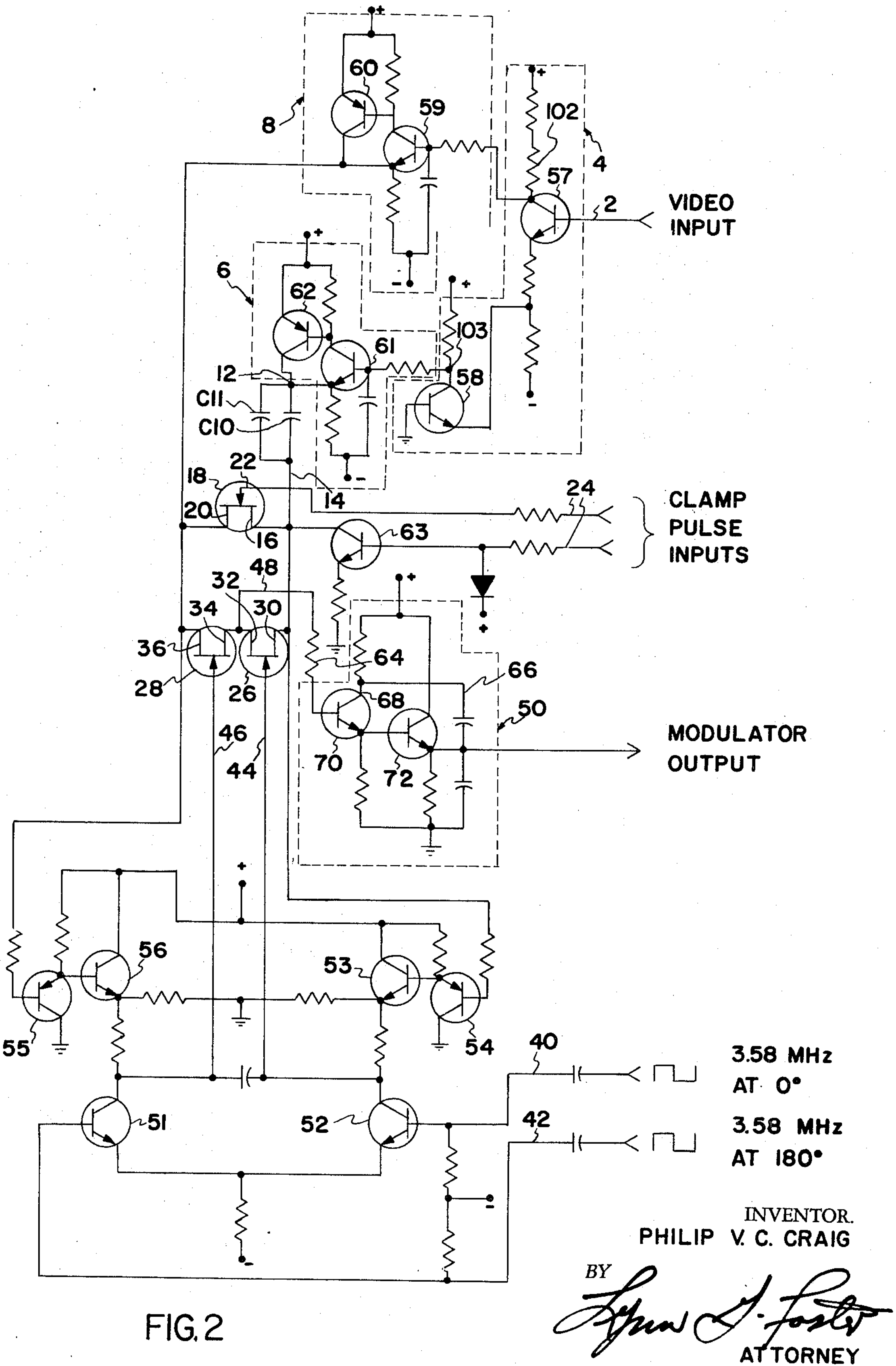
FIG. 2 is a circuit diagram of the balanced modulator of FIG. 1.

FIG. 2 shows a precision, low distortion phase splitter 4 on the input, driving two low loss, low impedance bootstrap emitter-followers 6 and 8 for the + and − video signals. These bootstrap emitter-followers 6 and 8 absorb the capacitive 2 ma current pulses from the charging and discharging of the gates 44 and 46 of chopper transistor 26 and 28 and their output 48. The 1.0 μfd clamp capacitor C10 is sufficiently large to absorb the charge involved. In the worst case condition, with 1.5 volts of video input producing 3 volts peak-to-peak output (90 IRE units) of the same phase for an entire horizontal scan line the total change in voltage across the capacitor C10 rises from 2 to 10 mv due to the 160 μA average DC charge current for 50 μsec.

The 5 μsec clamp has an RC time constant or 3 ohm x 1μfd = 3 μsec, reducing the offset charge back to 2mv. The clamp transistor 18 has 5 ma; one-half the current at gate 22, injected in the capacitor-blocked side 16, causing equal, cancelling 7.5 mv drops from the gate 22 to the source 20 and from the gate 22 to the drain 16.

FIG. 2 shows the chopper output 48 passing through a 10 K ohm resistor 64 into a double cascode emitter-follower 50 comprising transistors 70 and 72. This emitter-follower 50 has feedback, indicated at 66, to cause the collector 68 of transistor 70 to follow the input, thereby reducing Miller capacitance effects and input capacitance to almost zero. The purpose of this is to reduce the capacitance load on the chopper output 48, thus reducing the unbalance charge delivered to the clamp capacitor C10 and thereby improving the subcarrier rejection ratio. The sine wave filter, seen at 52 in FIG. 1, is not shown in the detailed diagram of FIG. 2. However, the circuitry of such filters is well known and, hence, need not be described here.

Obviously, numerous variations and modifications may be made without departing from the present invention. Accordingly, it should be clearly understood that the form of the present invention described above and shown in the accompanying drawings is illustrative only and is not intended to limit the scope of the invention.

I claim:

1. A balanced modulator circuit comprising:

a phase splitter for receiving a video input and producing two output signals having equal magnitudes but opposite polarities;

a pair of bootstrap emitter-followers each connected to receive a respective one of said outputs from said phase splitter;

a clamping circuit formed by a clamping field effect transistor, having a capacitor coupling the drain electrode of said clamping transistor to the output of one of said emitter-followers and having the source electrode of said clamping transistor connected to the output of the other of said emitter-followers, and a source of clamping pulses connected to supply the gate electrode of said clamping transistor;

a chopper circuit formed by a pair of chopping field effect transistors having the source electrode of one of said chopping transistors connected to the drain electrode of said clamping transistor and having the source electrode of the other of said chopping transistors connected to the source electrode of said clamping transistor while the drain electrodes of said chopping transistors are connected together to provide a chopper output; and a clock source generating two square wave signals at 3.58MHz, one of said signals having 0° phase and the other of said signals having 180° phase, and connected to apply said one of said signals to the gate electrode of said one of said chopping transistors and to apply the other of said signals to the gate electrode of said other of said chopping transistors.

2. The device of claim 1 further comprising:

a double cascode emitter-follower connected to receive said chopper output.

3. The device of claim 1 wherein:

each said transistor is a depletion type junction field effect transistor chopper.

4. The method of double balanced modulation to impress color information on the chrominance signal of a color television camera, said method comprising the steps of:

phase splitting the video input to provide two phases of video signals having equal magnitudes and opposite polarities;

clamping said two video signals when the value of said video input is zero to prevent subcarrier output; and field effect chopping said two video signals at a predetermined rate when said video input has a value other than zero to provide a color modulated subcarrier output.

5. The method of claim 4 wherein:

said predetermined rate is 3.58MHz.

* * * * *